United States Patent
Chou et al.

(10) Patent No.: US 11,870,726 B2
(45) Date of Patent: Jan. 9, 2024

(54) USER EQUIPMENT FOR SOUNDING REFERENCE SIGNAL TRIGGERING AND SOUNDING REFERENCE SIGNAL TRIGGERING METHOD

(71) Applicant: MediaTek Singapore Pte. Ltd., Singapore (SG)

(72) Inventors: Tzu-Han Chou, San Jose, CA (US); Cheng-Rung Tsai, Hsinchu (TW); Gyu Bum Kyung, San Jose, CA (US); Chien-Yi Wang, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 120 days.

(21) Appl. No.: 17/998,313

(22) PCT Filed: Aug. 3, 2021

(86) PCT No.: PCT/US2021/044309
§ 371 (c)(1),
(2) Date: Nov. 9, 2022

(87) PCT Pub. No.: WO2022/031679
PCT Pub. Date: Feb. 10, 2022

(65) Prior Publication Data
US 2023/0140402 A1    May 4, 2023

Related U.S. Application Data

(60) Provisional application No. 63/061,214, filed on Aug. 5, 2020.

(51) Int. Cl.
*H04W 72/04*    (2023.01)
*H04L 5/00*    (2006.01)
*H04W 72/232*    (2023.01)

(52) U.S. Cl.
CPC ......... *H04L 5/0051* (2013.01); *H04W 72/232* (2023.01)

(58) Field of Classification Search
CPC ........... H04W 72/232; H04W 72/0446; H04W 72/042; H04W 72/044; H04L 5/0051;
(Continued)

(56) References Cited

U.S. PATENT DOCUMENTS 11,129,057 B2 * 9/2021 Chervyakov ......... H04W 16/14
2017/0093506 A1 * 3/2017 Miao ..................... H04B 17/21
(Continued)

OTHER PUBLICATIONS

International Search Report and Written Opinion dated Nov. 15, 2021, issued in application No. PCT/US2021/044309.

*Primary Examiner* — Wei Zhao
(74) *Attorney, Agent, or Firm* — McClure, Qualey & Rodack, LLP

(57) ABSTRACT

User equipment (UE) for sounding reference signal (SRS) triggering is provided. The UE may include a radio frequency (RF) signal processing device and a processor. The RF signal processing device receives first slot offset information and second slot offset information from a network node. The first slot offset information is configured through a radio resource control (RRC) information element (IE) to indicate a first time difference between the down link control information (DCI) and a resource reference slot. The second slot offset information indicates the second time difference between the reference slot and an SRS resource. The processor is coupled to the RF signal processing device. When the RF signal processing device receives the DCI, the processor triggers an SRS transmission for the SRS resource according to the first slot offset information and the second slot offset information.

12 Claims, 4 Drawing Sheets

(58) Field of Classification Search
CPC ... H04L 5/0053; H04L 25/0226; H04L 5/005; H04B 1/7143; H04B 7/088
See application file for complete search history.

(56) References Cited

U.S. PATENT DOCUMENTS

| | | |
|---|---|---|
| 2019/0190669 A1 | 6/2019 | Park et al. |
| 2019/0254061 A1 | 8/2019 | Manolakos et al. |
| 2019/0349180 A1 | 11/2019 | Lu et al. |
| 2020/0059907 A1* | 2/2020 | Joseph ................. H04L 5/0041 |
| 2020/0146058 A1 | 5/2020 | Xu et al. |

* cited by examiner

USER EQUIPMENT FOR SOUNDING REFERENCE SIGNAL TRIGGERING AND SOUNDING REFERENCE SIGNAL TRIGGERING METHOD

CROSS REFERENCE TO RELATED APPLICATIONS

This Application claims priority of U.S. Provisional Patent Application No. 63/061,214, filed on Aug. 05, 2020, the entirety of which is incorporated by reference herein.

BACKGROUND OF THE INVENTION

Field of the Invention

The invention generally relates to a wireless communication technology, and more particularly, to a sounding reference signal (SRS) triggering technology.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In the 5G NR, the aperiodic sounding reference signal (A-SRS) triggering may be limited to the configurations configured through the radio resource control (RRC) signaling from the network. As a result, the A-SRS triggering is not flexible enough. Therefore, the flexible behaviors for triggering the A-SRS measurement need to be designed.

BRIEF SUMMARY OF THE INVENTION

User equipment (UE) for sounding reference signal (SRS) triggering and an SRS triggering method are provided to overcome the problems mentioned above.

An embodiment of the invention provides user equipment (UE) for sounding reference signal (SRS) triggering. The UE may comprise a radio frequency (RF) signal processing device and a processor. The RF signal processing device receives first slot offset information and second slot offset information from a network node. The first slot offset information is configured through a radio resource control (RRC) information element (IE) to indicate a first time difference between the down link control information (DCI) and the reference slot. The second slot offset information indicates a second time difference between the reference slot and an SRS resource. The processor is coupled to the RF signal processing device. When the RF signal processing device receives the DCI, the processor triggers an SRS transmission for the SRS resource according to the first slot offset information and the second slot offset information.

In some embodiments of the invention, the second slot offset information is carried on the DCI. In an embodiment, a new field is added in the DCI to carry on the second slot offset information. In another embodiment, the second slot offset information is carried on an unused field of the DCI.

In some embodiments of the invention, the RF signal processing device receives a media-access-control control-element (MAC-CE) from the network node, wherein the MAC-CE indicates a modified slot offset information, and the processor device triggers the SRS transmission for the SRS resource according to the modified slot offset information. In the embodiments, the MAC-CE is further used to carry start-position information of the SRS resource in a slot when a slot format is changed.

An embodiment of the invention provides a sounding reference signal (SRS) triggering method. The SRS triggering method is applied to user equipment (UE). The SRS triggering method comprises the following steps. The radio frequency (RF) signal processing device of the UE receives first slot offset information and second slot offset information from a network node, wherein the first slot offset information is configured through a radio resource control (RRC) information element (IE) to indicate a first time difference between the down link control information (DCI) and a resource reference slot. The second slot offset information indicates the second time difference between the reference slot and an SRS resource. When the RF signal processing device receives the DCI, the processor of the UE triggers an SRS transmission of the SRS resource according to the first slot offset information and the second slot offset information.

Other aspects and features of the invention will become apparent to those with ordinary skill in the art upon review of the following descriptions of specific embodiments of the UE and the SRS triggering method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
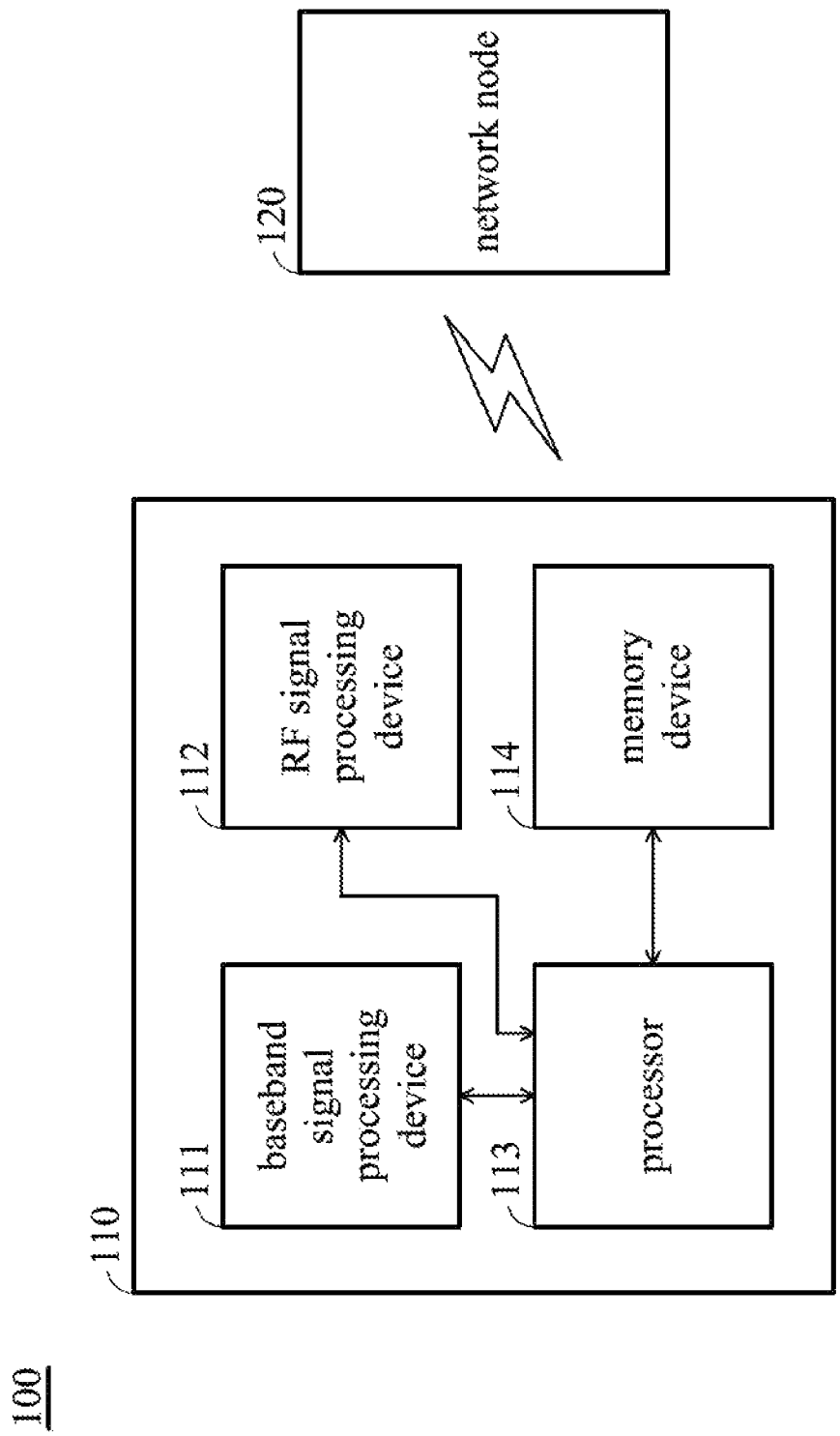
FIG. 1 is a block diagram of a wireless communications system 100 according to an embodiment of the invention.

FIG. 1 is a block diagram of a wireless communications system 100 according to an embodiment of the invention. As shown in FIG. 1, the wireless communications system 100 may comprise user equipment (UE) 110 and a network node 120. It should be noted that in order to clarify the concept of the invention, FIG. 1 presents a simplified block diagram in which only the elements relevant to the invention are shown. However, the invention should not be limited to what is shown in FIG. 1.

As shown in FIG. 1, the UE 110 may comprise at least a baseband signal processing device 111, a radio frequency (RF) signal processing device 112, a processor 113, a memory device 114, and an antenna module comprising at least one antenna. It should be noted that in order to clarify the concept of the invention, the UE 110 of FIG. 1 presents a simplified block diagram in which only the elements relevant to the invention are shown. However, the invention should not be limited to what is shown in FIG. 1.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may receive RF signals via the antenna and process the received RF signals to convert the received RF signals to baseband signals to be processed by the baseband signal processing device 111, or receive baseband signals from the baseband signal processing device 211 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 211 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

In the embodiments, the network node 120 may be a base station, a gNodeB (gNB), a NodeB (NB) an eNodeB (eNB), an access point, an access terminal, but the invention should not be limited thereto. In the embodiments, the UE 110 may communicate with the network node 120 through the fifth generation (5G) communication technology or 5G New Radio (NR) communication technology, but the invention should not be limited thereto.

In the embodiments of the invention, the UE 110 may detect or monitor whether there is a downlink control information (DCI) for triggering a sounding-reference-signal (SRS) transmission for a SRS resource (e.g. an aperiodic SRS (A-SRS)), wherein the DCI is carried by carried by a control channel (e.g. physical downlink control channel (PDCCH)) from the network node 120. When the UE 110 detects a DCI for triggering an SRS transmission for an SRS resource, the processor 113 of the UE 110 may trigger the SRS transmission according to the slot offset information from the network node 120. In an embodiment, the slot offset information may comprise first slot offset information and second slot offset information. Details are provided below.

Figure 2:
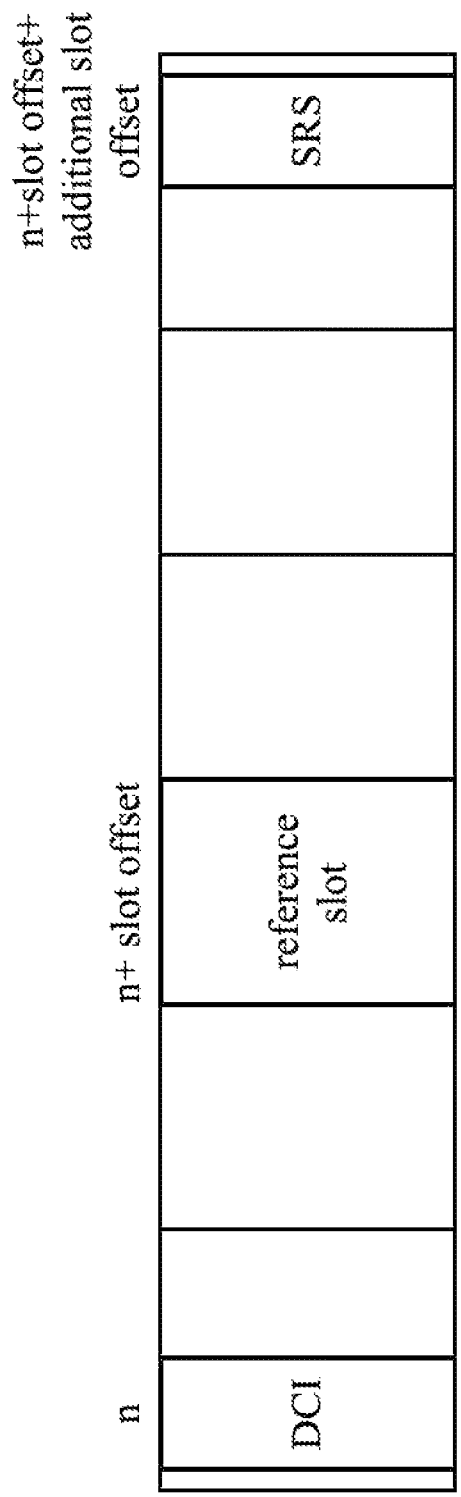
FIG. 2 is a schematic diagram of the triggering of an SRS transmission according to an embodiment of the invention.

In an embodiment of the invention, the RF signal processing device 112 may receive the first slot offset information from the network node 120 through a radio resource control (RRC) information element (IE). The first slot offset information may indicate a first time difference between a DCI and a reference slot. As illustrated in FIG. 2, the first slot offset information may indicate the time difference (i.e. slot offset) between the DCI at a slot n and the reference slot at slot (n+slot offset).

Furthermore, in an embodiment of the invention, the RF signal processing device 112 may further receive second slot offset information from the network node 120. The second slot offset information may be carried on the DCI. In the embodiment, the second slot offset information may indicate a second time difference between the reference slot and the SRS resource. As illustrated in FIG. 2, the second slot offset information may indicate the time difference (i.e. additional slot offset) between the reference slot at a slot (n+slot offset) and the SRS resource at slot (n+slot offset+additional slot offset).

When the RF signal processing device 112 receive the DCI for triggering the SRS transmission for the SRS resource, the processor 113 of the UE 110 may trigger the SRS transmission for the SRS resource according to the first slot offset information and the second slot offset information. As illustrated in FIG. 2, when the RF signal processing device 112 receives the DCI in a slot n, the UE 110 may trigger the SRS transmission for the SRS resource in the slot (n+slot offset+additional slot offset) according to the first slot offset information and the second slot offset information. In the embodiment, the DCI can carry additional slot offset information between the reference slot and the SRS resource.

In traditional SRS triggering, the UE 110 or other UEs in the serving cell only can obtain the first slot offset information from the network node 120 through the RRC signaling. Therefore, if the configured DCI is not in the default slot previously configured by the RRC, the UE will not trigger the SRS transmission for the SRS resource correctly. In the embodiment of the invention, the UE 110 or other UEs in the serving cell can obtain additional second slot offset information from the DCI. Therefore, the UE 110 or other UEs in the serving cell can normally trigger the SRS transmission for the SRS resource even if the configured DCI is not in the default slot configured by the RRC. In other words, in the embodiment, the network node 120 can transmit the DCI for triggering the SRS transmission to one or more UEs in different slots to direct the UE triggering the SRS transmission for the SRS resource. Therefore, the SRS triggering may become more flexible. It should be noted that FIG. 2 is only used to illustrate the embodiments of the invention, but the invention should not be limited thereto.

In an embodiment of the invention, a new field may be added in the DCI to carry on the second slot offset information.

In another embodiment of the invention, the second slot offset information may be carried on an unused field (e.g. an existing field is not used currently in the DCI or reserved bits in the DCI, but the invention should not be limited thereto) of the DCI. That is to say, in the embodiment, the second slot offset information can be carried on the unused field of the DCI without adding a new field in the DCI. For example, if a time domain resource assignment (TDRA) field of the DCI is not used currently, the TDRA field will be reused to carry the second slot offset information. In another example, if a physical downlink shares channel (PDSCH)-to-Hybrid Automatic Repeat request (HARQ) field of the DCI is not used currently, the PDSCH-to-HARQ field will be reused to carry the second slot offset information. In the embodiment, the network node 120 may transmit the DCI only for triggering the SRS transmission for the SRS resource without scheduling the PDSCH and physical uplink shares channel (PUSCH). It should be noted that the examples in the embodiment are only used to illustrate the embodiment of the invention, but the invention should not be limited thereto.

In an embodiment of the invention, the network node 120 may transmit a media-access-control control-element (MAC-CE) to the UE 110. The RF signal processing device 112 may receive the MAC-CE. The MAC-CE may be used to update an associated trigger list for the SRS resource. That is to say, the updated trigger list for the SRS resource may indicate a modified slot offset for the SRS transmission for the SRS resource. Therefore, in the embodiment, the processor 113 of the UE 110 may trigger the SRS transmission for the SRS resource according to the modified slot offset. As illustrated in FIG. 2, when the UE 110 receives the DCI for triggering the SRS transmission for the SRS resource at the slot n, the processor 113 of the UE 110 may trigger the SRS transmission for the SRS resource in the slot (n+modified slot offset) according to the MAC-CE, wherein in FIG. 2, the modified slot offset=slot offset+additional slot offset. Therefore, in the embodiment of the invention, the UE 110 or other UEs in the serving cell can trigger the SRS transmission for the SRS resource even if the configured DCI is not in the default slot previously configured by the RRC. Therefore, the SRS triggering may become more flexible.

Figure 3:
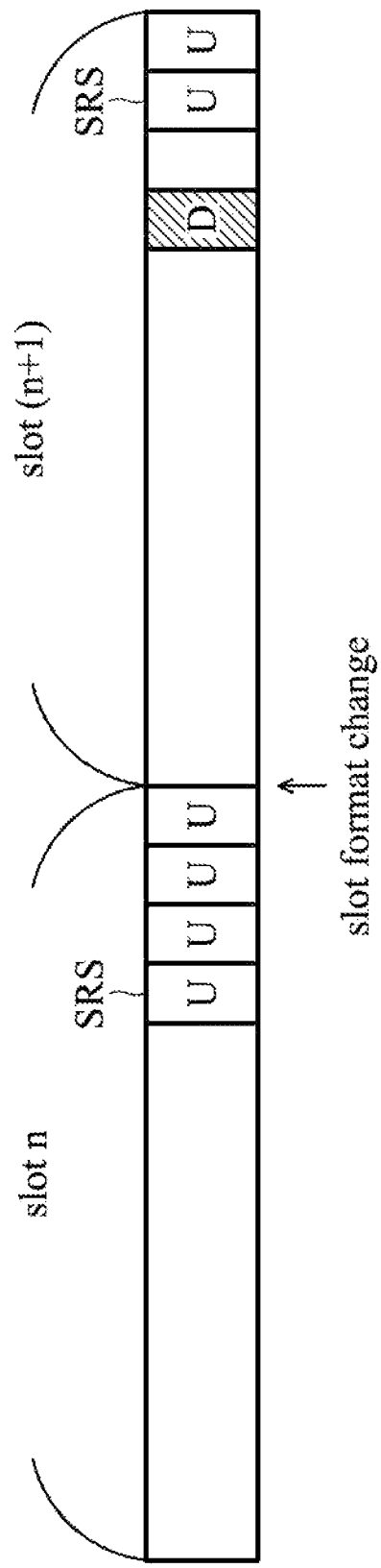
FIG. 3 is a schematic diagram of a slot format change according to an embodiment of the invention.

In an embodiment of the invention, the MAC-CE may be further used to carry start-position information of the SRS resource in a slot when a slot format is changed. Each slot format may define the allocation of uplink and downlink symbols in a slot. In addition, the slot format can be changed through a slot format indicator (SFI) from the network node 120. In the embodiment, when the slot format is changed, the network node 120 may transmit the MAC-CE to update an associated trigger list for the SRS resource. The updated trigger list for the SRS resource may indicate a new start position of the SRS source in the new slot format. FIG. 3 is a schematic diagram of a slot format change according to an embodiment of the invention. As shown in FIG. 3, in slot n, the start position of the SRS source is in the fourth symbol (uplink symbol) of slot n. When the slot format is changed in slot (n+1), the start position of the SRS source may be changed to the second symbol (uplink symbol) of the slot (n+1). Therefore, in the embodiment, the UE 110 will not miss SRS sounding opportunity due the slot format is changed.

Figure 4:
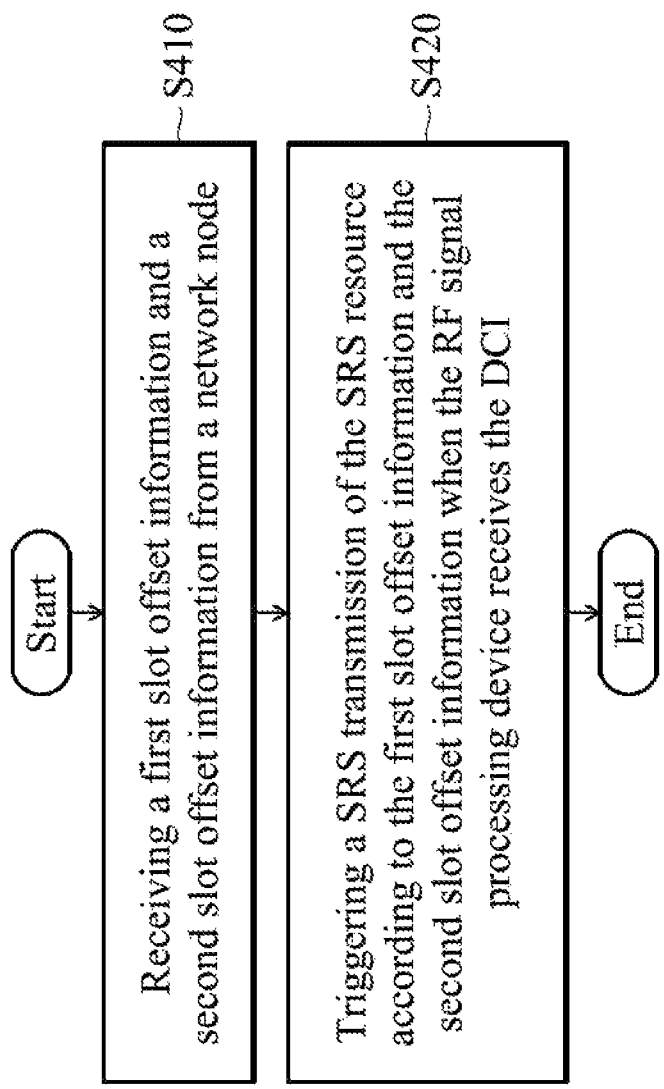
FIG. 4 is a flow chart 400 illustrating an SRS transmission triggering method according to an embodiment of the invention.

FIG. 4 is a flow chart 400 illustrating a sounding reference signal (SRS) triggering method according to an embodiment of the invention. The SRS triggering method can be applied to the communication system 100 which comprises the UE 110 and the network node 120. As shown in FIG. 4, in step S410, a radio frequency (RF) signal processing device of the UE 110 may receive first slot offset information and second slot offset information from a network node 120. The first slot offset information is configured through a radio resource control (RRC) information element (IE) to indicate the first time difference between the down link control information (DCI) and a resource reference slot. The second slot offset information indicates the second time difference between the reference slot and an SRS resource.

In step S420, when the RF signal processing device receives the DCI, the processor of the UE 110 may trigger an SRS transmission of the SRS resource according to the first slot offset information and the second slot offset information.

In some embodiments of the invention, in the SRS triggering method, the second slot offset information is carried on the DCI. In an embodiment, a new field is added in the DCI to carry on the second slot offset information. In another embodiment, the second slot offset information is carried on an unused field of the DCI.

In some embodiments of the invention, in the SRS triggering method, a media-access-control control-element (MAC-CE) from the network node is received by the RF signal processing device, wherein the MAC-CE indicates a modified slot offset information. The processor may trigger the SRS transmission for the SRS resource according to the modified slot offset information. In some embodiments of the invention, in the SRS triggering method, the MAC CE is further used to carry start-position information of the SRS resource in a slot when a slot format is changed.

In the SRS triggering method, the flexibility for triggering the SRS transmission will be increased through the DCI or the MAC-CE.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment (UE) for sounding reference signal (SRS) triggering, comprising:
   a radio frequency (RF) signal processing device, receiving a first slot offset information and a second slot offset information from a network node, wherein the first slot offset information is configured through a radio resource control (RRC) information element (IE) to indicate a first time difference between a down link control information (DCI) and a reference slot, and the second slot offset information indicates a second time difference between the reference slot and a SRS resource; and
   a processor, coupled to the RF signal processing device and triggering a SRS transmission for the SRS resource according to the first slot offset information and the second slot offset information when the RF signal processing device receives the DCI.

2. The UE of claim 1, wherein the second slot offset information is carried on the DCI.

3. The UE of claim 2, wherein a new field is added in the DCI to carry on the second slot offset information.

4. The UE of claim 2, wherein the second slot offset information is carried on an unused field of the DCI.

5. The UE of claim 1, wherein the RF signal processing device receives a media-access-control control-element (MAC-CE) from the network node, wherein the MAC-CE indicates a modified slot offset information, and the processor triggers the SRS transmission for the SRS resource according to the modified slot offset information.

6. The UE of claim 5, wherein the MAC CE is further used to carry a start-position information of the SRS resource in a slot when a slot format is changed.

7. A sounding reference signal (SRS) triggering method, applied to a user equipment (UE), comprising:
   receiving, by a radio frequency (RF) signal processing device of the UE, a first slot offset information and a second slot offset information from a network node, wherein the first slot offset information is configured through a radio resource control (RRC) information element (IE) to indicate a first time difference between a down link control information (DCI) and a reference slot, and the second slot offset information indicates a second time difference between the reference slot and a SRS resource; and
   triggering, by a processor of the UE, a SRS transmission of the SRS resource according to the first slot offset information and the second slot offset information when the RF signal processing device receives the DCI.

8. The SRS triggering method of claim 7, wherein the second slot offset information is carried on the DCI.

9. The SRS triggering method of claim 8, wherein a new field is added in the second DCI to carry on the slot offset information.

10. The SRS triggering method of claim 8, wherein the second slot offset information is carried on an unused field of the DCI.

11. The SRS triggering method of claim 7, wherein a media-access-control control-element (MAC-CE) from the network node is received by the RF signal processing device, wherein the MAC-CE indicates a modified slot offset information, and the SRS transmission for the SRS resource is triggered by the processor according to the modified slot offset information.

12. The SRS triggering method of claim 11, wherein the MAC CE is further used to carry a start-position information of the SRS resource in a slot when a slot format is changed.

* * * * *